Jan. 31, 1956     W. E. KOCK     2,733,438
METALLIC LENS ANTENNA
Filed Dec. 30, 1947     3 Sheets-Sheet 1
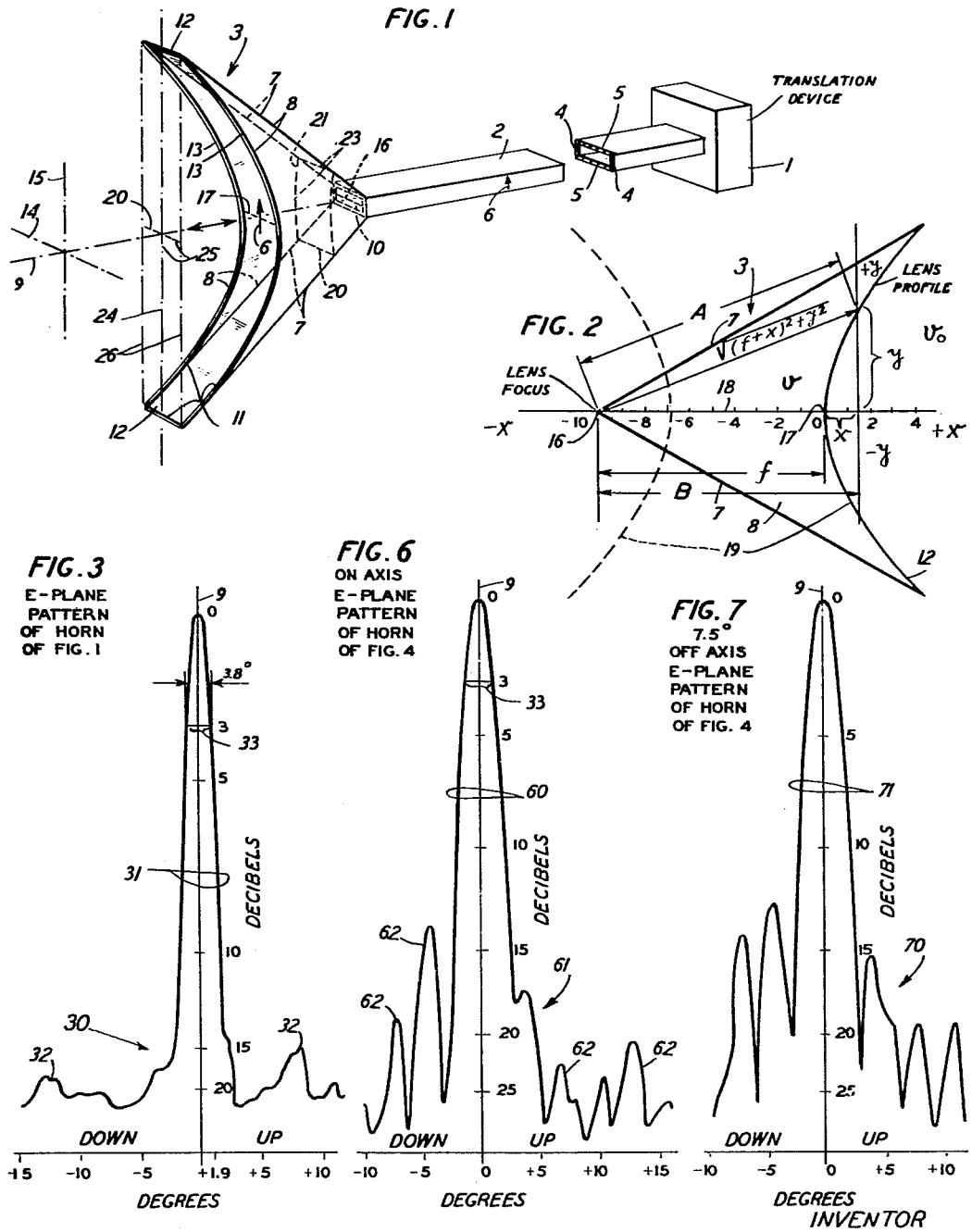
INVENTOR
W. E. KOCK
BY
*A. J. Zerbarini*
ATTORNEY Jan. 31, 1956 W. E. KOCK 2,733,438
METALLIC LENS ANTENNA
Filed Dec. 30, 1947 3 Sheets-Sheet 3

INVENTOR
W. E. KOCK
BY A. J. Zerbarini
ATTORNEY

United States Patent Office 2,733,438
Patented Jan. 31, 1956

2,733,438

METALLIC LENS ANTENNA

Winston E. Kock, Middletown, N. J., assignor to Bell Telephone Laboratories, Incorporated, New York, N. Y., a corporation of New York Application December 30, 1947, Serial No. 794,529

2 Claims. (Cl. 343—909)

This invention relates to directive radio systems and more particularly to lenses utilized in directive antenna systems.

My copending application, Serial No. 642,723, filed January 22, 1946, discloses and claims a "fast" or "phase advance" metallic lens having a refractive index smaller than unity and comprising a large plurality of spaced parallel conductive plates. The lens is cylindrically symmetrical and has a line focus, the focusing being effected in only one plane, namely, the plane perpendicular to the line focus. The lens has a plane front face and a concave elliptical back face. While the above-mentioned fast plano-concave metallic lens has been successfully used and is highly satisfactory it now appears advantageous to utilize, in certain systems as, for example, a sectoral horn system, a simple biconcave fast metallic lens having a line focus.

It is one object of this invention to focus radio waves in an efficient and highly satisfactory manner.

It is another object of this invention to focus waves without appreciable attenuation and without substantial reflective losses.

It is another object of this invention to obtain a simple, inexpensive, easily constructed and highly useful metallic fast radio lens having a point focus.

It is another object of this invention to eliminate spherical aberration in a metallic lens having a circular face and a focus displaced from the center of the circle corresponding to the circular contour of said face.

It is another object of this invention to obtain, in a lens having a short real focal length, a long virtual focal length.

In accordance with one embodiment of the invention a metallic lens for refracting waves having a given wavelength and electric polarization comprises a sectoral horn having wide tapered walls positioned parallel to the aforesaid polarization and spaced apart at least one-half of said wavelength. The contour of the horn mouth orifice is hyperbolically concave in the plane of the electric polarization of the wave, that is, the so-called E-plane, and linear in the so-called H-plane. The horn has a focal line which passes through the center of the horn throat orifice. The throat orifice is connected by means of a dielectric guide to a translation device. In transmission the cylindrical wave front emanating from the throat orifice is converted by the horn and lens to an outgoing plane wave front and a so-called fan beam lobe having narrow E-plane dimension is secured. In reception, the converse operation is obtained and the incoming plane wave is transformed by the horn and lens to a cylindrical wave front converging on the focal line.

The invention will be more fully understood from a perusal of the following specification taken in conjunction with the drawing on which like reference characters denote elements of similar function and on which:

Fig. 1 is a perspective view of one embodiment of the invention;

Fig. 2 is an explanatory diagram used in describing the embodiment of Fig. 1;

Fig. 3 illustrates the measured E-plane directive pattern of a horn lens constructed in accordance with Fig. 1;

Figs. 6 and 7 are, respectively, on-axis and off-axis E-plane directive patterns for a horn lens constructed in accordance with Fig. 4.

Figure 4:
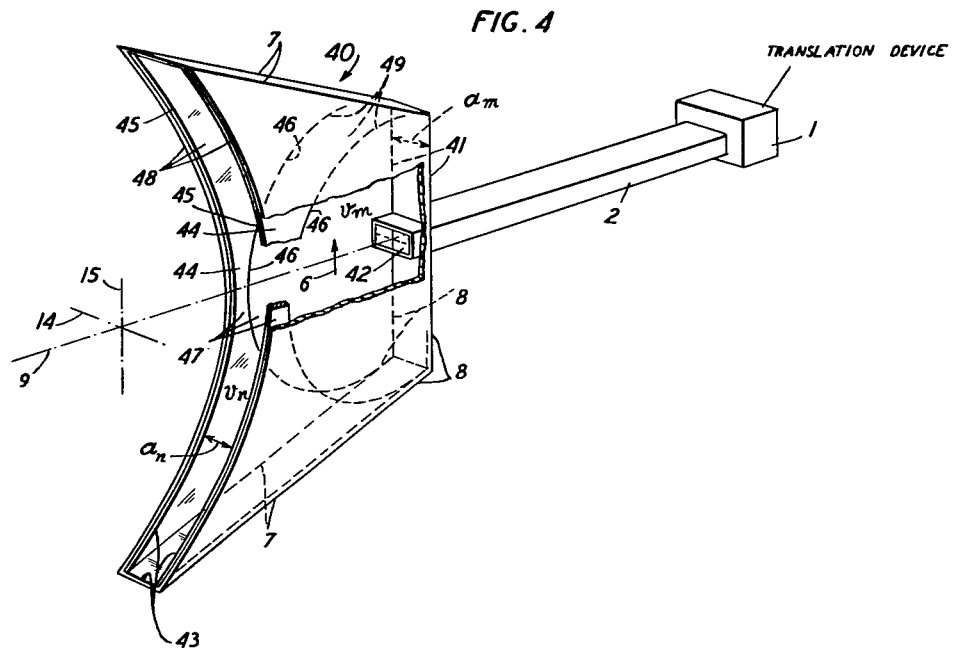
Fig. 4 is a perspective view of another embodiment of the invention.

Referring to Fig. 1, there is shown a translation device 1, such as a transmitter, receiver or a radar transceiver, connected by a non-square rectangular dielectric guide 2 to a sectoral horn 3. The guide 2 has a pair of narrow walls 4 and a pair of wide walls 5 and is designed to convey waves having an electric polarization 6 parallel to the narrow guide walls 4. The horn 3 comprises two narrow angularly related metallic walls 7 having equal uniform widths and two wide parallel walls 8 having equally tapered widths. The wide horn walls 8 and the two narrow guide walls 4 are parallel. Also, the horn 3 has an axis 9, a recangular throat orifice 10, which is coincident with the open far end of guide 2, and a mouth orifice 11 formed by the transverse edges 12 of the narrow horn wall 7 and the longitudinal edges 13 of the wide horn walls 8. The edges 13 of the wide horn walls 8 have the same concave hyperbolic curvature, as explained in more detail in connection with Fig. 2, and the edges 12 of the horn walls 7 are linear, so that the mouth orifice 11 corresponding to the front face of the horn lens, has a cylindro-hyperbolic contour and the projection of the periphery of the mouth orifice on a plane perpendicular to the horn axis is rectangular. More specifically, the outh orifice or lens face 11 is linear in the H-plane 14 and hyperbolic in the E-plane 15 containing the electric polarization 6. The horn lens has a line focus 16 coincident with the longitudinal center line of the throat aperture.

Referring to Fig. 2, the curvature of the edges 13 will now be determined. Assuming a ray A and a ray B are propagated from the focus 16 to the mouth orifice 11, respectively, along paths coincident with and at an angle to axis 9, the times or periods used by the two rays in reaching orifice 11 should be equal or, stated mathematically, $$t_A = \frac{\sqrt{(f+x)^2 + y^2}}{v} \tag{1}$$

$$t_B = \frac{f}{v} + \frac{x}{v_0} \tag{2}$$

and $$t_A = t_B = \frac{\sqrt{(f+x)^2 + y^2}}{v} = \frac{f}{v} + \frac{x}{v_0} \tag{3}$$

where $t_A$ is the time taken by ray A $t_B$ is the time taken by ray B $f$ is the distance from the focus 16 to the vertex 17 of the mouth orifice curvature, that is, the focal length of the horn lens 3 or horn lens face 11

$x$ and $y$ are ordinates, the origin being at the vertex 17

$v$ is the phase velocity inside the horn and is a function of the so-called "a" dimension of the horn corresponding to the spacing between the wide horn walls 8

$v_0$ is the phase velocity in free space.

Now $$n = \frac{v_0}{v} \quad (4)$$

where $n$ is the refractive index of the horn lens, so that $$(f+x)^2 + y^2 = \left(f - \frac{x}{n}\right)^2 \quad (5)$$

and $$f^2 + 2fx + x^2 + y^2 = f^2 + 2f\frac{x}{n} + \frac{x^2}{n^2} \quad (6)$$

or $$x^2\left(\frac{1}{n^2} - 1\right) + 2fx\left(\frac{1}{n} - 1\right) - y^2 = 0 \quad (7)$$

which is the equation of a hyperbola with the origin taken at the vertex 17. Equation 7 may readily be reduced to the conventional equation $$\frac{(x_1)^2}{a^2} - \frac{y^2}{b^2} = 1 \quad (8)$$

for a hyperbola, where the origin $$x_1 = 0 \quad (9)$$
$$y = 0 \quad (10)$$

is at the center 18 of the two hyperbolae 19. Thus in equation 7, letting the term $$\left(\frac{1}{n^2} - 1\right) = C \quad (11)$$

and the term $$2f\left(\frac{1}{n} - 1\right) = d \quad (12)$$

we obtain $$cx^2 + dx - y^2 = 0 \quad (13)$$

or $$x^2 + \frac{d}{c}x - \frac{y^2}{c} = 0 \quad (14)$$

adding $$\frac{d^2}{4c^2} \quad (15)$$

to both sides of Equation 14 we have $$x^2 + \frac{d}{c}x + \frac{d^2}{4c^2} - \frac{y^2}{c} = \frac{d^2}{4c^2} \quad (16)$$

and reducing, we get $$\left(x + \frac{d}{2c}\right)^2 - \frac{y^2}{c} = \frac{d^2}{4c^2} \quad (17)$$

Letting the distance between the center 18 and the vertex 17 equal $$x_1 - x = \frac{d}{2c} \quad (18)$$

or $$x_1 = x + \frac{d}{2c} \quad (19)$$

we have $$(x_1)^2 - \frac{y^2}{c} = \frac{d^2}{4c^2} \quad (20)$$

or $$\frac{x_1^2}{\frac{d^2}{4c^2}} - \frac{y^2}{\frac{d^2}{4c}} = 1 \quad (21)$$

Let $$\sqrt{\frac{d^2}{4c^2}} = a \quad (22)$$

and $$\sqrt{\frac{d^2}{4c}} = b \quad (23)$$

we have $$\frac{x_1^2}{a^2} - \frac{y^2}{b} = 1 \quad (24)$$

and Equation 24 has the form of Equation 8. Hence the contour of the longitudinal edges 13 of walls 8 and of the orifice or face 11 is hyperbolic in the E-plane 15.

In transmission, Fig. 1 waves having an electric polarization 6 and a wavelength λ, at least twice the H-plane, or so-called "a," dimension of guide 2 are conveyed in guide 2 from device 1 to the throat orifice 10. The wave propagated in horn 3 has a substantially linear front 20 in the H-plane 14, by reason of the relatively close spacing of the wide horn walls 8, and a circular front 21 in the E-plane 15, that is, the wave front is cylindrical as shown by the dotted lines 23. In passing through the mouth orifice 11 the circular front 21 is converted to a linear front 24 by virtue of the hyperbolic contour of the orifice 11, but the linear front 20 is not affected, so that the wave has a plane front 25 immediately after emerging from the horn 3. Hence the refractive action occurs only in the E-plane 15. Stated differently, the outgoing beam has a relatively wide dimension in the H-plane 14 but a very narrow dimension, by reason of the refractive effect of the hyperbolic contour, in the E-plane 15 whereby a fan beam is established. In reception an incoming plane wave front is converted by the hyperbolic horn lens to a cylindrical front converging on the focal line 16. More specifically, in the E-plane 15 the incoming rays are focused on the focal line 16 but no focusing action occurs in the H-plane 14.

In one embodiment constructed in accordance with Fig. 1, and successfully tested, the length of the horn was six inches, the chord subtending the hyperbolic mouth orifice was twenty-four inches, the short and long transverse dimensions of the guide were respectively one-half inch and one inch and the test wavelength was 1.34 inches. As shown in Fig. 3, the measured E-plane directive pattern 30 for the tested horn lens includes a major lobe 31 and the minor lobes 32. The major lobe is by reason of the focusing action of the hyperbolic lens extremely narrow, the half power width 33 being about 3.8 degrees, and the minor lobes are relatively insignificant since they are 15 decibels down from the peak of the major lobe.

It may be noted that the hyperbolic contour or lens in a sense renders the horn 3 unifocal. Thus at a distance from horn 3, considering the E-plane 15, the wave appears to originate at the center point of the straight vertical line 24 included in the plane 26 of the horizontal wall edges 12, and in the H-plane 14 the wave appears to originate at the center point of the short straight line 20 in the mouth plane 26. Since the aforesaid points are superimposed and in the plane of the horn mouth edges 12, the horn may be considered to be unifocal. On the other hand, considering the E-plane 15, in a conventional sectoral horn not equipped with a mouth lens and having a rectangular mouth aperture in the plane 26, at the remote or distant point the waves appear to originate at the center point of the focal line 16 or throat aperture. In the H-plane 14, the waves appear to originate at the center point of line 20 in the mouth plane 26, as in the horn of Fig. 1. Since these last-mentioned points are displaced along the horn axis the conventional horn is bifocal.

Referring to Fig. 4, there is shown a sectoral horn 40 of the box type comprising a pair of narrow walls 7 of uniform width and a pair of wide tapered walls 8 and an end or throat wall 41. The spacing "$a_m$" between the wide horn walls 8 is greater than one-half of the longest wavelength in the design wavelength band; and the corresponding phase velocity, $v_m$, for this portion of the horn is greater than the phase velocity $v_0$ of free space. The rectangular guide 2 from the translation device 1 projects through the central portion of the end wall 41, and its rectangular end opening 42 constitutes in a sense the throat orifice of the horn 40. The longitudinal dimension of the throat orifice 42 is perpendicular to the electric wave polarization 6 and to the wide walls 8. As in the embodiment of Fig. 1, the horn mouth orifice 43 has a hyperbolic contour in the E-plane 15 and a linear contour in the H-plane 14. Numerals 44 denote flat metallic plates or members, each attached to the inner surface of a different wide horn wall 8 and extending longitudinally parallel to the wave polarization 6. The front edge 45 of each member has a hyperbolic contour coincident with the hyperbolic curvature of the associated wide horn wall 8; and the back edge 46 of each member has a circular contour. The spacing "$a_n$" between the plates 44 is smaller than the spacing "$a_m$" but greater than one-half the longest design wavelength, and the corresponding phase velocity $v_n$ of this portion of the horn is greater than the phase velocity $v_m$. It is thus apparent that plates 44 and the air dielectric therebetween constitute a fast lens 47 having its focal line 16 aligned with the mean longitudinal axis of the throat orifice 42 and having a front cylindro-hyperbolic concave face 48 and a back cylindrical concave face 49. As will now be explained the axis of the cylinder corresponding to the concave contour of the back face 49 is displaced a critical distance from the focal line 16 or real focus $f_1$, whereby all rays appear to come from the virtual focus $f_2$, so that spherical aberration is avoided and the lens simulates an optical microscope objective.

Figure 5:
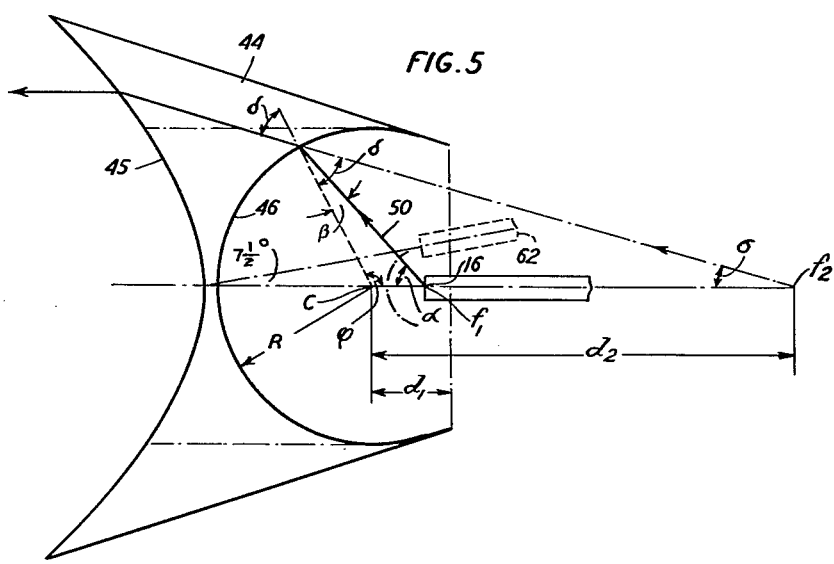
Fig. 5 is an explanatory diagram used in describing the embodiment of Fig. 4.

Referring to Fig. 5, the circle corresponding to the cylindrical front face 49 has a center C and a radius R. Numeral 50 denotes a typical ray emanating from the focal line 16, that is the real focus $f_1$, and passing through the lens 47. As shown on the drawing, the ray is refracted upon entering the lens 47 and refracted again upon leaving the lens. Now from Snell's law $$N = \frac{v_n}{v_m} = \frac{\sin \delta}{\sin \beta} \tag{25}$$

where N is the ratio, for example, 2, of the phase velocities in the two mediums, or the so-called "relative" refractive index of the channel referred to free space, and from the law of sines $$\frac{\sin \alpha}{\sin \beta} = \frac{R}{d_1} \tag{26}$$

where $d_1$ is the distance between the real focus 16, or $f_1$, and the center C of the circle.

Now, if $$d_1 = \frac{R}{N} \tag{27}$$

we have $$\frac{\sin \delta}{\sin \beta} = N = \frac{\sin \alpha}{\sin \beta} \tag{28}$$

so that $$\alpha = \delta \tag{29}$$

Also, if $$d_2 = NR \tag{30}$$

where $d_2$ is the distance between the virtual focus, $f_2$, and the center C of the circle we have, from the law of sines $$\frac{R}{d_2} = \frac{\sin \sigma}{\sin \delta} = \frac{1}{N} \tag{31}$$

But the angle $\phi$ is common to the two triangles so that $$\alpha + \beta = \sigma + \delta \tag{32}$$

and $$\beta = \sigma \tag{33}$$

Hence, $$\frac{1}{N} = \frac{\sin \beta}{\sin \delta} \tag{34}$$

or, as in Equation 25

$$N = \frac{\sin \delta}{\sin \beta} \tag{35}$$

Accordingly, regardless of the value of angle $\delta$, all rays emanating from the real focus $f_1$ appear to emanate from a single point $f_2$, and hence spherical aberration is avoided. In this connection reference is made to pages 80 and 81 of "Physical Optics," third edition, by R. W. Wood, and to page 613 of "Physics" by A. W. Duff (Blakeston 1926, sixth edition).

The operation, in transmission and reception, of the embodiment of Fig. 4 is believed to be apparent in view of the explanation given above in connection with Fig. 1. Briefly considered the lens 47 converts, in the E-plane 15, the circular front emanating from the throat orifice 42 to a linear front, whereby the cylindrical front originating at the focal line 16 is converted to a plane wave front and, in reception, the converse operation is obtained. Stated differently, focusing action is obtained only in the plane 15 and the major lobe of the horn-lens combination has a fan beam shape.

As already indicated, Fig. 6 illustrates the E-plane directive pattern for a system comprising a lens constructed in accordance with Fig. 4, the pattern being measured with the axis of guide 2 aligned with or "on" the axis 9 of the lens 47. shown in Fig. 6, the half power width 33 of the major lobe 60 of the measured E-plane pattern 61, is relatively narrow and the minor lobes 62 are about 14 decibels down and therefore insignificant. In the tested lens the maximum linear dimension of the mouth orifice was twenty-four inches, the axial length or depth was sixteen inches and the spacings $a_m$ and $a_n$ were respectively 1.25 and 0.75 inches.

The embodiment of Fig. 4 is preferred over the embodiment of Fig 1, for certain purposes, for two reasons. First of all, for a given axial length and mouth orifice size, the effective focal length is greater. Secondly, the coma aberration is smaller since a small scanning movement of the open guide end, or real focus $f_1$, Fig. 5, in a direction perpendicular to the electromagnetic axis of the lens, corresponds to a wide movement of the virtual focus $f_2$. Thus, in the actually constructed system described above and including the lens of Fig. 4, with the guide feed or primary antenna about 7.5 degrees off the axis as shown by reference numeral 62, the measured E-plane pattern 70 illustrated in Fig. 7 was obtained. The major lobe 71 of pattern 70, Fig. 7, for the "off-axis" condition compares favorably with the major lobe 60 of the "on-axis" pattern 61 and the minor lobe or lobes, if any, produced by coma in the pattern 70 are below 12.5 degrees and therefore relatively low.

Figure 8:
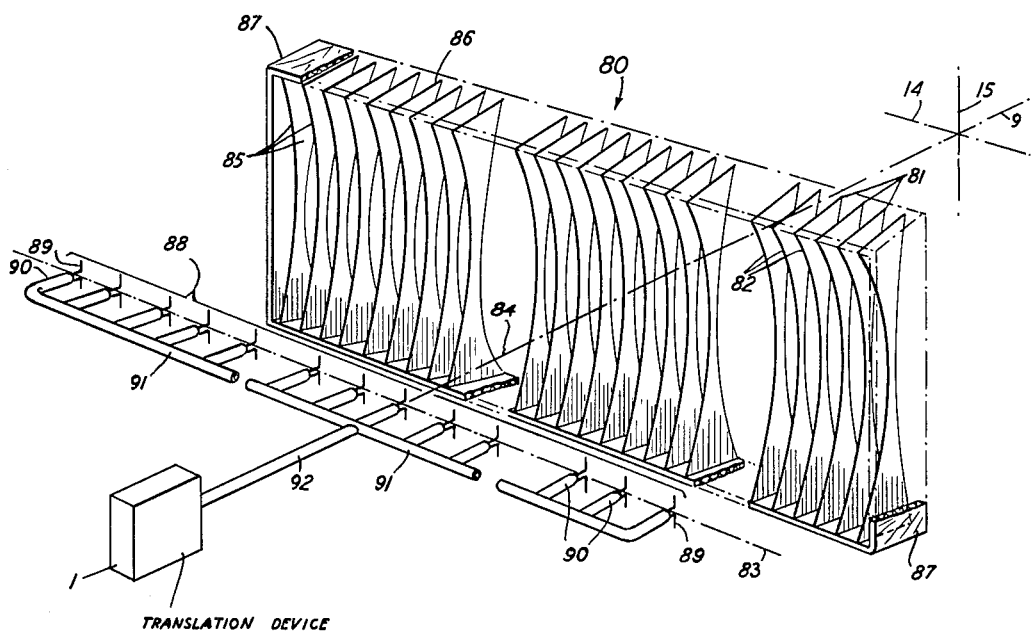
Fig. 8 is a perspective view of another embodiment of the invention.

Referring to Fig. 8, there is shown a dielectric guide type of metallic lens 80 having a front face 81, a back face 82, a line focus 83 and an electromagnetic axis or axial plane 84. The front face 81 has a hyperbolic curvature in the E-plane 15 and a linear contour in the H-plane 14; and the back face 82 has a circular curvature in the E-plane 15 and a linear contour in the H-plane 14. Stated differently, the lens has a circular-cylindrical back face and a hyperbolic-cylindrical front face and is therefore cylindrically symmetrical; and it may be termed a cylindrical-hyperbolic metallic lens. The axis of the cylinder corresponding to the back face 82 is coincident with the focal line 83. The equation for the hyperbolic contour is the same as that given by Equation 7.

Except for the contours of the front and back faces 81, 82, the lens 80 is the same as the cylindrically symmetrical lens disclosed and claimed in my above-mentioned copending application. More specifically, the lens 80 comprises a plurality of dielectric channels 85 each comprising a pair of adjacent metallic plates 86 spaced a distance greater than one-half of the longest wavelength in the design band and in the air dielectric included therebetween. The plates are held in position by the wooden members 87. A linear array 88 of transmitting or receiving dipoles 89 is aligned with the focal line 83 and each dipole 89 is parallel to the plates, that is, the plates extend parallel to the E-plane 15. The dipoles are connected by the dipole coaxial lines 90, the two branch lines 91 and the main coaxial line 92 to the translation device 1.

In operation, highly directive radio action is obtained in the E-plane 15 by reason of the focusing action of the lens 80 and highly directive action is secured in the H-plane 14 by reason of the directive effect of the linear array 88 so that a point type beam is obtained, that is, the half power E and H-plane widths of the major lobe are relatively small. Considered differently, the lens 80 has a vertical fan beam characteristic, the major lobe of the lens taken alone being narrow in the E-plane and wide in the H-plane, whereas the array 88 has a horizontal fan beam characteristic, the major lobe of the array taken alone being narrow in the H-plane and wide in the E-plane. The resultant major lobe of the lens-array system is, in a sense, a combination of the perpendicular fan beam lobes mentioned above, and, hence is narrow in both planes.

Although the invention has been explained in connection with specific embodiments it should be understood that it is not to be limited to the embodiments described inasmuch as other apparatus may be successfully utilized in practicing the invention.

What is claimed is:

1. A lens comprising a plurality of flat metallic members spaced apart and positioned parallel to said polarization, said members having a first set of corresponding longitudinal edges and a second set of corresponding longitudinal edges, the edges of the first set having the same circular contour and the edges of the second set having the same hyperbolic contour, the centers of the circles corresponding to the circular contours of the back edges being positioned between said back edges and said focal line, the distance between said focal line and the center of each circle being equal to the radius of the circle divided by the ratio of the phase velocity inside the lens to the phase velocity outside said lens.

2. A refracting device, comprising a pair of narrow walls having uniform widths and a pair of wide walls having tapered widths, a pair of flat conductive members attached to the inner surfaces of said wide walls and extending to said narrow walls, said members having only two pairs of corresponding longitudinal edges; one pair of corresponding longitudinal edges having parallel hyperbolic contours and the other pair of corresponding longitudinal edges having parallel circular contours.

References Cited in the file of this patent

UNITED STATES PATENTS

| Re. 23,003 | Barrow | May 25, 1948 |
| 880,208 | Germain et al. | Feb. 25, 1908 |
| 1,507,212 | Silberstein | Sept. 2, 1924 |
| 2,442,951 | Iams | June 8, 1948 |

FOREIGN PATENTS

| 327,312 | France | Mar. 23, 1903 |

OTHER REFERENCES

Proc. IRE, November 1946, vol. 34, pp. 838–836.